United States Patent

Critoph et al.

[11] Patent Number: 5,845,507
[45] Date of Patent: Dec. 8, 1998

[54] THERMAL COMPRESSIVE DEVICE

[75] Inventors: Robert Edward Critoph; Roger Thorpe, both of Conventry, United Kingdom

[73] Assignee: University of Warwick, United Kingdom

[21] Appl. No.: 809,330
[22] PCT Filed: Sep. 22, 1995
[86] PCT No.: PCT/GB95/02251
  § 371 Date: May 9, 1997
  § 102(e) Date: May 9, 1997
[87] PCT Pub. No.: WO96/09504
  PCT Pub. Date: Mar. 28, 1996

[30] Foreign Application Priority Data

Sep. 23, 1994 [GB] United Kingdom .................. 9419202

[51] Int. Cl.⁶ ................................................ F25B 17/08
[52] U.S. Cl. ................................. 62/106; 62/480; 62/434
[58] Field of Search ........................... 62/480, 476, 106, 62/235.1, 430, 434

[56] References Cited

U.S. PATENT DOCUMENTS

| | | | |
|---|---|---|---|
| 4,479,364 | 10/1984 | Maier-Laxhuber | 62/141 |
| 4,594,856 | 6/1986 | Rothmeyer | 62/112 |
| 4,694,659 | 9/1987 | Shelton | 62/106 |
| 4,765,395 | 8/1988 | Paeye et al. | 165/104.12 |
| 5,079,928 | 1/1992 | Rockenfeller et al. | 62/106 |
| 5,347,815 | 9/1994 | Jones | 62/46.2 |
| 5,419,156 | 5/1995 | Sywulka | 62/476 |
| 5,477,706 | 12/1995 | Kirol et al. | 62/480 |
| 5,566,468 | 10/1996 | Graeff | 34/80 |

Primary Examiner—William Doerrler
Attorney, Agent, or Firm—Fish & Richardson, PC

[57] ABSTRACT

A thermal compressor (10) comprises two adsorbent beds (11, 12) each with an associated thermal management system (14). The thermal management systems (14) are identical and consist of a circulating supply of a control fluid which passes through the adsorbent bed, a pump (15), a heat exchanger (16) and an inert bed (17, 18). Heat removed from the adsorbent beds (11, 12) by the control fluid is supplied to the inert beds (17, 18) and is store to be subsequently regenerated to heat the adsorbent beds (11, 12) in a later half of the operating cycle of the thermal compressor (10). The thermal compressor (10) is energy efficient by virtue of the heat recycling which is performed.

12 Claims, 2 Drawing Sheets

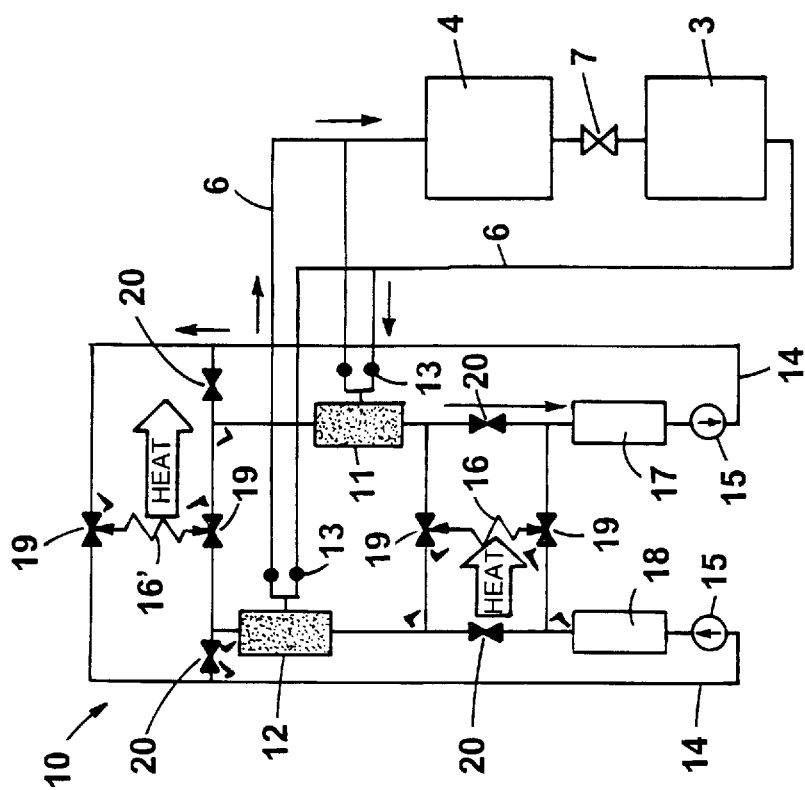
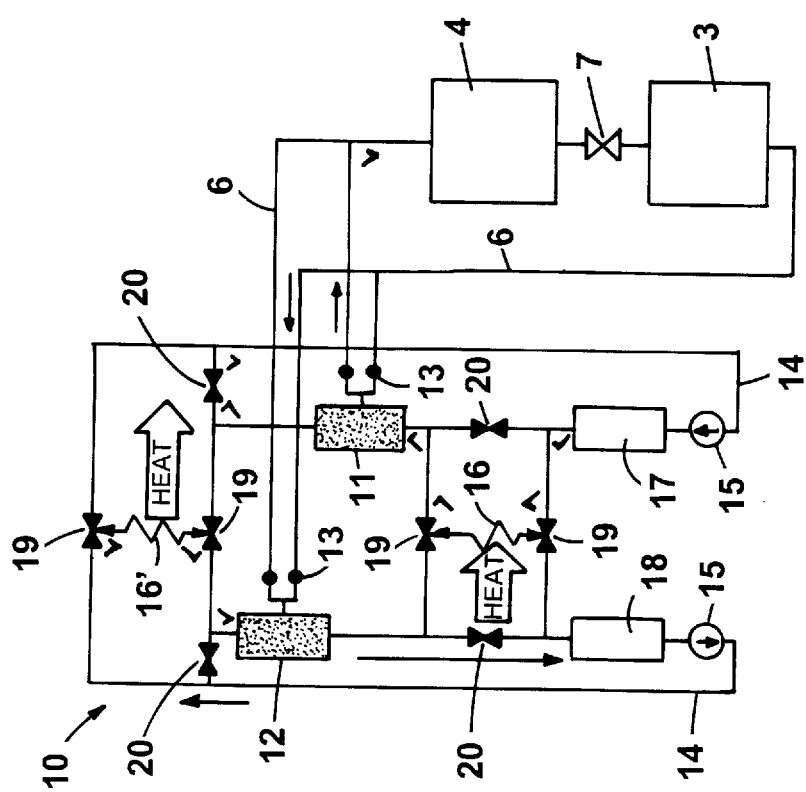

THERMAL COMPRESSIVE DEVICE

BACKGROUND

The present invention relates to a thermal compressive device particularly, but not exclusively, for use in the compression of a fluid in a heat pump or cooling system.

Heat pumps and cooling systems are used to remove heat from or to introduce heat to a region which causes the temperature of the region to be lowered or raised. This is done by circulating a fluid which is in turn compressed, condensed and evaporated.

In adsorptive heat pumps and cooling systems the circulating fluid is adsorbed and desorbed from a material, an adsorbent, to achieve the desired compression of the fluid. This has the benefit that the energy needed to drive the adsorptive system can be in the form of heat which means that the heat pump or cooling system may be gas or oil fired or even solar powered rather than powered by electricity. Of course electricity may still be required to operate control mechanisms and circuitry but the energy demand of such control circuitry is sufficiently low for it to be powered by a conventional battery. This means that adsorptive heat pumps and cooling systems may be operated in areas which are not connected to an electricity supply grid and can be inherently more efficient in their use of primary energy since they use heat directly rather than in a converted form such as electricity.

To enable a better understanding of the basic adsorptive process an ideal solar refrigerator, shown schematically in FIG. 1, will now be described. An adsorptive refrigerator such as the solar powered refrigerator shown relies on the principle that certain materials for example active carbons, zeolites or silica gels are able to adsorb large quantities (for example 30% by weight) of most gases within their micropores and that the quantity of a gas, or adsorbate as it is commonly referred to, adsorbed by such a material, or adsorbent as it is commonly referred to, at a particular pressure is inversely dependent on the temperature of the adsorbent. Hence, at low temperatures larger quantities of gases or adsorbates may be present within the material or adsorbent than at higher temperatures. In a physical adsorption process no overall chemical reaction occurs between the adsorbent and adsorbate. Instead the adsorbate becomes trapped or held within the micropores or structural matrix of the adsorbent without any overall change in state of the matrix. In a chemical adsorption process a reversible chemical reaction occurs which may result in changes in the matrix structure.

As shown in FIG. 1, the adsorptive solar refrigerator consists of an insulated box 1, the interior of which is to be cooler than the surrounding environment, a liquid receiver 2, an evaporator 3, a condenser 4 and a solar collector 5. The receiver 2, evaporator 3, condenser 4 and collector 5 are all in communication with one another by means of conduits 6 within which the adsorbate circulates. The solar collector 5 contains an adsorbent and is positioned so as to be exposed to the sun. The collector 5 is connected to the condenser 4 which is positioned so as to be able to reject heat to the environment. The condenser 4 is in turn connected to the receiver 2 and the evaporator 3, both of which are located within the insulated box 1 and are also connected to each other.

The cycle of the refrigerator begins in the morning when the collector 5 is at ambient temperature and the evaporator 3, but not the receiver 2, is full of cold liquid refrigerant which also functions as the adsorbate. The adsorbent in the collector 5 contains the maximum quantity of refrigerant since the collector 5 is at its lowest cycle temperature. As the sun heats up the collector 5, the temperature of the adsorbent rises and some refrigerant is desorbed in a gaseous form from the collector 5. Since the refrigerator system has a fixed volume, as refrigerant is desorbed, the pressure in the system rises. The gaseous refrigerant is not condensed because the saturation temperature corresponding to the system pressure is below ambient temperature. During the day, as more heat is transferred to the adsorbent, more refrigerant is desorbed raising the pressure of the system until the pressure becomes high enough for refrigerant to condense in the condenser 4. As the refrigerant condenses in the condenser 4 the resulting latent heat is rejected into the environment and the condensed refrigerant trickles down to the receiver 2. At this stage the pressure within the system remains substantially constant. When the collector 5 and thereby the adsorbent reaches its maximum cycle temperature, a minimum concentration of refrigerant in the adsorbent is reached and the receiver 2 contains its maximum quantity of condensed refrigerant.

As the collector 5 cools, later in the day, so the adsorbent begins to adsorb the surrounding gaseous refrigerant. This lowers the system pressure and the heat generated by adsorption is released into the environment. The reduction in system pressure causes simultaneous boiling of the condensed refrigerant in the receiver 2. This results in gaseous refrigerant being produced to replace that being adsorbed. The energy needed for boiling the refrigerant comes from the liquid refrigerant in the receiver 2 which causes a drop in the temperature within the insulated box 1. Ultimately, the liquid in the receiver 2 reaches the temperature of any liquid remaining in the evaporator 3. Where, as is usually the case, the evaporator 3 is surrounded by a water jacket, the energy needed for continued boiling of the refrigerant is drawn from the water jacket which causes ice to form. As the water freezes the evaporating temperature stabilises and becomes governed by heat transfer between the evaporator 3 and the ice front. Ideally, enough ice will be formed over night to keep the insulated box cool over the next day. As the night progresses adsorbance of the refrigerant will reach a maximum until the cycle is repeated when the collector 5 is heated again by the sun the next day.

Such an adsorptive refrigerator is of limited use since the adsorbent goes through only one cycle per day since the heat of the sun is utilised and approximately 5 kg of active carbon would be required for each kilogramme of ice formed.

BRIEF SUMMARY

To overcome some of the limitations of the refrigerator described above, a system for providing a continuous adsorptive cycle has been developed in which two adsorptive collectors or beds are arranged in tandem with suitable valving. In this way whilst one bed is being heated and is therefore desorbing refrigerant the other bed is cooling and is adsorbing refrigerant. The cycles of the two beds are ideally 180° out of phase and provide continuous compression of the refrigerant. In a refrigerator, the valves in the system route the adsorbed or desorbed refrigerant to the condenser and away from the evaporator accordingly. This enables the adsorptive beds to cycle through adsorbance and desorbance many times in one day, which reduces the amount of adsorbent needed to achieve the same cooling effect. The cycle time of the adsorbent beds is limited by the efficiency of conduction of heat through the beds which by their very nature are poor conductors of heat. Additionally, heat may be transferred from one of the adsorbent beds to the other of the beds and vice versa in order to improve efficiency. The heat from one bed is thus used to pre-heat the other in a regenerative process (that is heat from one bed is recovered to be used to heat the other bed).

A known adsorptive system which addresses the problem of poor heat conduction relies on a "convective" cycle. With such a known system the adsorbent material is provided in a form which has a high surface area, for example small grains, so that the efficiency of convective heat transfer is improved. Each of the adsorbent beds is thus arranged so that a fluid may be circulated through the bed. The circulating fluid is used for heat transfer to or from the adsorbent material depending upon the temperature gradient between the circulating fluid and the bed. Ideally the circulating fluid is the same as the adsorbate (refrigerant) so that difficulties with varying partial pressures in the system may be avoided.

Each of the adsorbent beds has a respective heat transfer circulation system. When in use, the circulating fluid for one of the adsorbent beds is heated externally of the adsorbent bed in a conventional heat exchanger and is then pumped through the adsorbent bed. The heat of the circulating fluid is given up to the surrounding adsorbent grains which, as they are heated, desorb some of the adsorbate. The circulating fluid which emerges from the adsorbent bed is now cold and is fed back to the heat exchanger. Once the concentration of adsorbate in the adsorbent bed is reduced to a predetermined level, the direction of circulation of the fluid is reversed and the fluid, which is now cooled in the same or a separate heat exchanger, passes through the adsorbent bed to remove heat from the bed which is then rejected to the environment through the heat exchanger. The adsorbent bed is thereby cooled and adsorbate is adsorbed by the bed. As mentioned above, the two beds are operated out of phase so that whilst one is adsorbing refrigerant the other is desorbing refrigerant. Hence, whilst the circulating fluid for one bed is being heated in its heat exchanger, the circulating fluid for the other bed is being cooled in its heat exchanger.

Moreover, heat can be regenerated by being transferred from the circulating fluid for one of the adsorbent beds to the circulating fluid of the other adsorbent bed. Thus, the circulating fluid which is heating one of the beds emerges from the bed cold and passes through a further heat exchanger which is common to both circulation systems and through which is also passing hot circulating fluid emerging from the second bed. A transfer of heat between the two circulating fluids takes place before the fluids move on to their respective heat exchangers and pumps.

During the heating and cooling of the adsorbent beds, a phenomenon known as a "thermal wave" is generated. The thermal wave is in the form of a temperature front which moves along the adsorbent bed in the direction of flow of the circulating fluid. Hence, when the circulating fluid is hot, at the thermal front there is a sharp drop in the temperature of the adsorbent bed from a high to a low temperature and similarly when the circulating fluid is cool, the temperature of the bed increases sharply across the front from cold to hot. The thermal wave propagates through the bed from one end to the other. Once the thermal wave breaks through at the far end of the adsorbent bed, which can be detected by a rapid rise or fall in the temperature of the emerging circulating fluid, this is the point when the direction of flow of the circulating fluid is reversed and the process repeated. The thermal wave phenomenon is known to maximise the thermal efficiency of such systems.

The above known system, however, has the disadvantage that a common or inter-loop heat exchanger is used to regenerate heat energy from one of the adsorbent beds to the other. The inter-loop exchanger transfers heat from a gas circulating in one direction to a gas circulating in the opposite direction and is a major component which is costly and complicated in construction. Moreover the difficulties of forcing the heating time of one bed to equal the cooling time of the other and the dynamic variation in temperature of the gas streams entering the heat exchanger reduces the actual quantity of heat regeneration to significantly less than the ideal.

The present invention seeks to overcome the problems described above with conventional heat pumps and cooling systems and seeks to provide an efficient but simple thermal compressive device which may be used with heat pumps and cooling systems to compress the fluid used in the heat pump or cooling system. The present invention provides a thermal compressive device which relies on the adsorptive properties of a material which vary with respect to temperature to compress a fluid.

The present invention provides a thermal compressive device comprising an adsorbent device having means for connection to a supply of adsorbate and arranged to enable a fluid to flow through the adsorbent device, fluid circulating means connected to the adsorbent device for circulating a fluid through the adsorbent device and a temperature controlling device provided with the fluid circulating means for raising or lowering the temperature of the circulating fluid characterised by further including a thermal storage device connected to the fluid circulating means and containing a thermally capacitive material arranged to enable the fluid to flow through the thermal storage device whereby heat is drawn from or supplied to the adsorbent device by the circulating fluid and is respectively stored in or supplied from the thermal storage device.

Preferably, the thermal storage device consists of a pressurised vessel having an inlet and outlet connected to the fluid circulating means and containing a matrix of thermally capacitive and conductive material. The matrix of thermally capacitive and conductive material may be in the form of a plurality of steel balls.

Ideally, the fluid circulated by the fluid circulating means is the same as the adsorbate, for example ammonia. Also, the adsorbent device may be in the form of an adsorbent bed of active carbon for example.

In a preferred embodiment the temperature controlling device is a conventional heat exchanger which may be gas or oil fired.

Moreover, for continuous compression the thermal compressive device may have two or more adsorbent devices each having associated fluid circulating means, a temperature controlling device and a thermal storage device and further including controlling means for ensuring each of the adsorbent devices is operated out of phase with respect to the other adsorbent devices and valving means for controlling the connection of each of the adsorbent devices to the supply of adsorbate.

The present invention is suited for use for example in domestic, commercial and industrial heat pumps, refrigeration systems, air conditioning systems, thermal transformers and vehicle heating and cooling systems.

It will of course be understood that in the context of the present invention, reference to a thermally capacitive material is reference to a material which has the property of good thermal capacity and is therefore suited to temporary heat storage.

An embodiment of the present invention will now be described by way of example only, with reference to the accompanying drawings, in which:

BRIEF DESCRIPTION OF THE DRAWINGS

FIGS. 2a and 2b show schematically a thermal compressor in accordance with the present invention in a cooling system.

DETAILED DESCRIPTION

Figure 1:
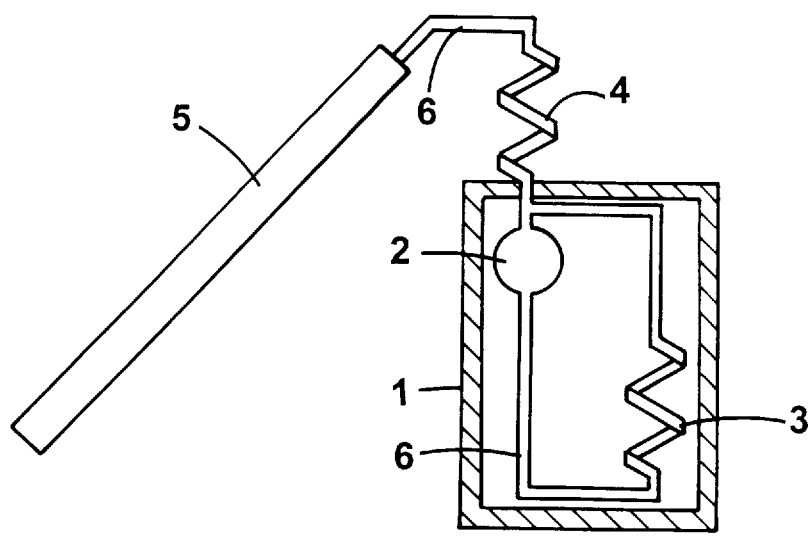
FIG. 1 shows schematically an idealised adsorptive solar powered refrigerator.

The thermal compressor 10 shown in FIGS. 2a and 2b is connected to the condenser 4, evaporator 3 and expansion valve 7 of a conventional refrigeration system. The compressor 10 has two active adsorbent beds 11, 12 each of which is connected by fluid supply means in the form of conduits 6 to the condenser 4 and evaporator 3. Suitable valving means 13 are provided to control the flow of refrigerant, which is also the adsorbate, to and from the condenser 4, evaporator 3 and the adsorbent beds 11, 12. The adsorbent beds 11, 12 may contain active carbon, zeolites or silica gel for example and require characteristics of porosity and permeability to provide the desired adsorbancy.

Each of the adsorbent beds 11, 12 has a temperature management system 14 associated with it. The temperature management systems 14 are used to raise and lower the temperature of the respective adsorbent beds 11, 12 and thereby increase or decrease the quantity of refrigerant adsorbed by the beds 11, 12. As mentioned earlier, variation in the quantity of adsorbed refrigerant varies the fluid pressure of the refrigeration system as a whole enabling heat to be drawn from the evaporator 3 when the refrigerant boils at lower system pressures.

Each of the active adsorbent beds 11, 12 is arranged so as to enable a fluid to be fed through the bed. For example, the bed may consist of adsorbent grains around which the fluid is free to flow. The temperature management systems 14 have a circulating supply of a temperature control fluid which is fed through the respective active adsorbent beds 11, 12. The control fluid is ideally the same as the refrigerant so as to avoid problems with varying partial pressures in the refrigeration system. The control fluid is pumped about the temperature management system 14, through supply lines by means of a pump 15. In FIGS. 2a and 2b the direction in which the control fluid is being circulated is indicated by an arrow on the pumps 15. The temperature management systems 14 also include conventional heat exchangers 16 and 16' which are used to introduce heat to the control fluid 16 and to extract heat from the control fluid 16'. The heat exchangers may be gas or oil fired. In FIGS. 2a and 2b two heat exchangers 16, 16' are shown connected to both temperature management systems 14. Suitable valving 19, 20 is provided to connect or isolate the heat exchangers 16, 16' to or from the temperature management systems 14. Alternatively, each temperature management system 14 may have respective heat exchangers 16, 16' for heating and cooling the control fluid. However, since the heat exchangers are costly it is preferred that a single pair of heat exchangers 16, 16' are used which are common to both temperature management systems 14.

A respective regenerative bed 17, 18 is also connected to the supply lines of each temperature management system 14. The regenerative beds 17, 18, which may also be described as inert thermal storage beds, are used to store heat recovered from their associated adsorbent beds 11, 12. The stored heat is then re-used to heat the associated adsorbent bed in the following cycle of the system. The inert beds 17, 18 are in the form of pressurised vessels packed with a plurality of steel balls, which being good conductors of heat and thermally massive are efficient at extracting heat from a fluid flowing around them and at storing the extracted heat. Alternatively, ceramic or other metallic structures may replace the steel balls. In each case the material used has good thermal capacity and is suited to heat storage.

With the thermal compressor 10 shown in FIGS. 2a and 2b no heat transfer takes place between the individual temperature management systems 14. Therefore an inter-loop heat exchanger is dispensed with.

In FIG. 2a one half of the cycle of the thermal compressor 10 is shown, the other half of the cycle is shown in FIG. 2b. In FIG. 2a the first active adsorbent bed 11 is being heated whereas the second active adsorbent bed 12 is being cooled. Hence, the control fluid in the temperature management system 14 associated with the first active bed 11 is pre-heated in the heat exchanger 16 and is then fed via a 3-way valve 19 through the active bed 11 which is heated by the control fluid and thereby desorbs refrigerant to the refrigerator system through the check valve 13. The control fluid emerging from the active bed 11 is cool and is circulated via a shut off valve 20, which is held open, through the respective regenerative inert bed 17 before being returned to the heat exchanger 16 to be re-heated. A thermal wave passes through the active bed 11 as it is being heated by the continued circulation of the control fluid. A separate thermal wave passes simultaneously through the regenerative inert bed 17. This will be described in greater detail later. Once the control fluid emerging from the active bed 11 is hot, that is the thermal wave breaks through the end of the active bed 11, which can be detected by a conventional temperature sensor, the direction of flow of the control fluid is reversed to that shown in FIG. 2b.

In FIG. 2b the control fluid is now circulated through a fluid cooling heat exchanger 16' before entering the active bed 11. The control fluid is cool and therefore removes heat from the active bed 11. Heat from the active bed 11 is carried by the control fluid via a further shut off valve 20 to the regenerative inert bed 17 and so the temperature of the inert bed 17 is increased. Not all the heat from the active bed 11 can be stored in the regenerative bed 17 and some therefore is rejected to the environment by means of the fluid cooling heat exchanger 16'.

Thermal waves pass through both the active bed 11 and the inert bed 17, though in the former case the thermal wave is a cold wave whereas in the latter case the thermal wave is a hot wave. Once the thermal wave has broken through the end of the active bed 11 and the emergent control fluid is cool the direction of flow of the control fluid is again reversed to start a new cycle. In the new cycle, since the inert bed 17 is hot from the previous cycle, heat from the inert bed 17 is regenerated from the previous cycle to heat the active bed 11 in the new cycle. Thus, as the hot thermal wave passes through the active bed 11 a cold thermal wave simultaneously passes through the inert bed 17.

Whilst the first active bed 11 is being heated, as mentioned earlier, the second active bed 12 is operating out of phase and so is being cooled. Similarly whilst the first active bed 11 is being cooled, the second active bed 12 is being heated. Appropriate opening and closing of the check valves 13, three way valves 19 and shut off valves 20 ensures that the two active beds 11, 12 and their associated temperature management systems 14 operate to provide a continuous compressive effect on the refrigerant in the refrigerator system.

As mentioned earlier, since the adsorptive compression enables heat to be used directly, the heat exchanger 16 can be oil or gas fired. Moreover, by developing thermal waves in both the active beds 11, 12 and the inert beds 17, 18 the efficiency of heat transfer and heat recycling can be optimised but it is not essential for a thermal wave effect to be developed in the beds.

Where the thermal compressor 10 is used as part of a heat pump rather than a refrigerator, the heat rejected at the heat exchanger 16' can provide part of the heat generated by the heat pump. In the case of a refrigerator this heat is rejected to the environment. As will be appreciated adaption of the system shown in FIG. 2 to provide a heat pump rather than a cooling system is straightforward as is the design and arrangement of the valving means for controlling the circulation of the control fluids through the temperature management systems 14 and the heat exchangers 16, 16'.

It will also be appreciated that since heat exchange between the two active beds 11, 12 is not performed, it is not essential for there to be two active adsorbent beds. This of course would not provide continuous compression. The high temperature heat input, external heat exchanger output, condenser output and evaporator output would only occur for half the time but the high efficiency of the system described above would be undiminished. Although the compression would not be continuous, sufficient thermal storage can be built into such a gas or oil fired heat exchanger and desorption cooler to enable a continuous output of heat or chill. Operation of a single active bed and associated thermal management system should avoid any difficulties in the control of the various valves 13, 19, 20 and any difficulties in maintaining the phase relationship between two active beds.

Similarly, the system need not be limited to operating two active beds in tandem. Three or more active beds each with an associated thermal management system may be provided, each operating in phased relationship to one another.

Reference has been made herein to the use of the thermal compressive device in a heat pump or cooling system. The thermal compressive device may also form part of domestic or commercial air conditioning systems, refrigeration systems, heat pumps and as thermal transformers for example. The thermal compressive device could also be used as part of a vehicle heating or cooling system, for example using the engine of the vehicle as a heat source.

Depending upon its application the thermal compressor described operates at ambient temperatures and is capable of generating heat outputs of up to 500° C. or even 1000° C. Of course, the operating temperature will affect the selection of adsorbent material and adsorbate. As mentioned earlier the adsorbent may be active carbon, zeolites or silica gel. The adsorbate may be, for example, ammonia or water. Also, the cycling time of the thermal compressor may range from 0.5 minutes to 20 minutes although for most applications a cycle time between 1 minute and 10 minutes is suitable.

We claim:

1. A thermal compressive device comprising one or more adsorbent devices having means for connecting the one or more adsorbent devices to a supply of adsorbate, each adsorbent device being arranged to enable a circulating fluid to flow therethrough, and a temperature control system for sequentially raising and lowering the temperature of the circulating fluid supplied to each of the adsorbent devices, wherein (each adsorbent device has a respective thermal storage device containing a thermally capacitive material and arranged to enable the circulating fluid to flow therethrough, and wherein each thermal storage device is coupled to its respective adsorbent device by the circulating fluid such that, in a cyclical manner, heat drawn from each adsorbent device by the circulating fluid is separately supplied to and stored in the respective thermal storage device by the circulating fluid and returned to the adsorbent device.

2. The thermal compressive device of claim 1, wherein the thermal storage device comprises a pressurized vessel having an inlet and an outlet for the circulating fluid and containing a matrix of thermally capacitive and conductive material.

3. The thermal compressive device of claim 2, wherein the matrix of thermally capacitive and conductive material comprises closely packed steel balls.

4. The thermally compressive device of claim 1, wherein the circulating fluid is the same as the adsorbate.

5. The thermally compressive device of claim 1, wherein the adsorbent device comprises a bed having a pressurized vessel containing a matrix of active adsorbent material and having an inlet and an outlet for the circulating fluid and a further port for connection to a supply of adsorbate.

6. The thermally compressive device of claim 5, wherein the matrix of active adsorbent material comprises active carbon.

7. The thermal compressive device of claim 1, wherein the temperature control system includes a heat exchanger to raise or lower the temperature of the circulating fluid.

8. The thermal compressive device of claim 7, wherein the heat exchanger is oil or gas fired.

9. The thermal compressive device of claim 1 comprising two or more adsorbent devices each having an associated fluid circulating means, a temperature controlling device and a thermal storage device and further including controlling means for ensuring that each of the adsorbent devices is operated out of phase with respect to the other adsorbent devices and valving means for controlling the connection of each of the adsorbent devices to the supply of adsorbate.

10. The thermal compressive device of claim 1 in combination with a condenser and an evaporator of a heat pump or cooling system.

11. The thermal compressive device of claim 5, wherein the circulating fluid is the same as the adsorbate and is in direct contact with the matrix of active adsorbent material.

12. A thermal compressive device comprising:

at least two adsorbent devices having means for connecting the at least two adsorbent devices to a supply of adsorbate, each adsorbent device being arranged to enable a circulating fluid to flow therethrough, and a temperature control system for sequentially raising and lowering the temperature of the circulating fluid supplied to each of the adsorbent devices characterized by each adsorbent device having a respective thermal storage device containing a thermally capacitive material and being arranged to enable the circulating fluid to flow therethrough whereby each thermal storage device is coupled to its respective adsorbent device by the circulating fluid such that, in a cyclical manner, heat drawn from each adsorbent device by the circulating fluid is separately supplied to and stored in the respective thermal storage device by the circulating fluid and returned to the adsorbent device to form separate thermal waves in each of the adsorbent devices.

* * * * *